(12) United States Patent
Kania et al.

(10) Patent No.: US 11,097,827 B2
(45) Date of Patent: Aug. 24, 2021

(54) SYSTEMS AND METHODS FOR INSULATION OF AIRCRAFT COOLING SYSTEMS

(71) Applicant: The Boeing Company, Chicago, IL (US)

(72) Inventors: Anthony J. Kania, Summerville, SC (US); Anthony E. Hunt, North Charleston, SC (US); Carlos E. Lindner, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 149 days.

(21) Appl. No.: 16/547,642

(22) Filed: Aug. 22, 2019

(65) Prior Publication Data
US 2019/0375490 A1 Dec. 12, 2019

Related U.S. Application Data

(63) Continuation of application No. 15/592,920, filed on May 11, 2017, now Pat. No. 10,472,042.

(51) Int. Cl.
*B64C 1/40* (2006.01)
*F16L 59/02* (2006.01)
*F28F 17/00* (2006.01)

(52) U.S. Cl.
CPC ............ *B64C 1/40* (2013.01); *F16L 59/022* (2013.01); *F28F 17/005* (2013.01); *F28F 2270/00* (2013.01)

(58) Field of Classification Search
CPC ....... B64C 1/40; F16L 59/022; F28F 2270/00; F28F 17/005
See application file for complete search history.

(56) References Cited

U.S. PATENT DOCUMENTS

| | | | | |
|---|---|---|---|---|
| 7,896,033 B2 * | 3/2011 | Hallot | ................ | F16L 1/16 138/149 |
| 10,472,042 B2 | 11/2019 | Kania et al. | | |
| 2018/0031340 A1 * | 2/2018 | Wilson | ................ | F28F 27/006 |
| 2018/0328647 A1 | 11/2018 | Kania et al. | | |

OTHER PUBLICATIONS

"U.S. Appl. No. 15/592,920, Corrected Notice of Allowance dated Sep. 23, 2019", 4 pgs.
"U.S. Appl. No. 15/592,920, Notice of Allowance dated Jul. 10, 2019", 10 pages.
"U.S. Appl. No. 15/592,920, Restriction Requirement dated Mar. 11, 2019", 10 pgs.

* cited by examiner

*Primary Examiner* — Elizabeth J Martin
(74) *Attorney, Agent, or Firm* — Kwan & Olynick LLP

(57) ABSTRACT

Provided are insulating apparatuses, and methods of operation, for thermal insulation and drainage of cooling system tubing. An example insulating apparatus comprises an elongated strip including a first end and a second end. A medial portion, a first edge, and a second edge, each run from the first end to the second end. The first and second edges curl around respective longitudinal axes toward the medial portion to form a first wrap portion with a first cavity defined by an interior surface of the first wrap portion, and a second wrap portion with a second cavity defined by an interior surface of the second wrap portion. A channel above the medial portion is defined by an exterior surface of each of the first and second wrap portions. The first and second cavities are interconnected with the channel through a first gap and a second gap, respectively.

20 Claims, 11 Drawing Sheets

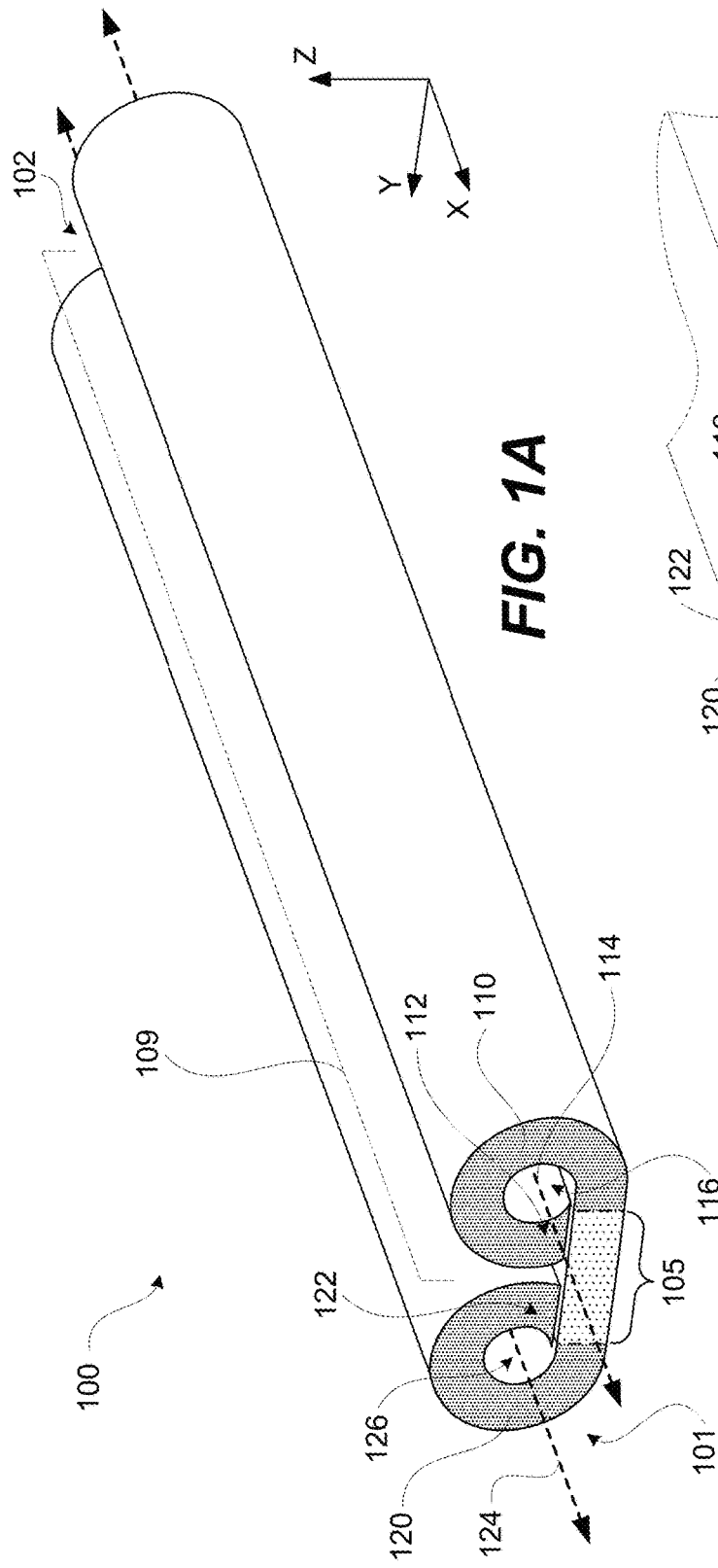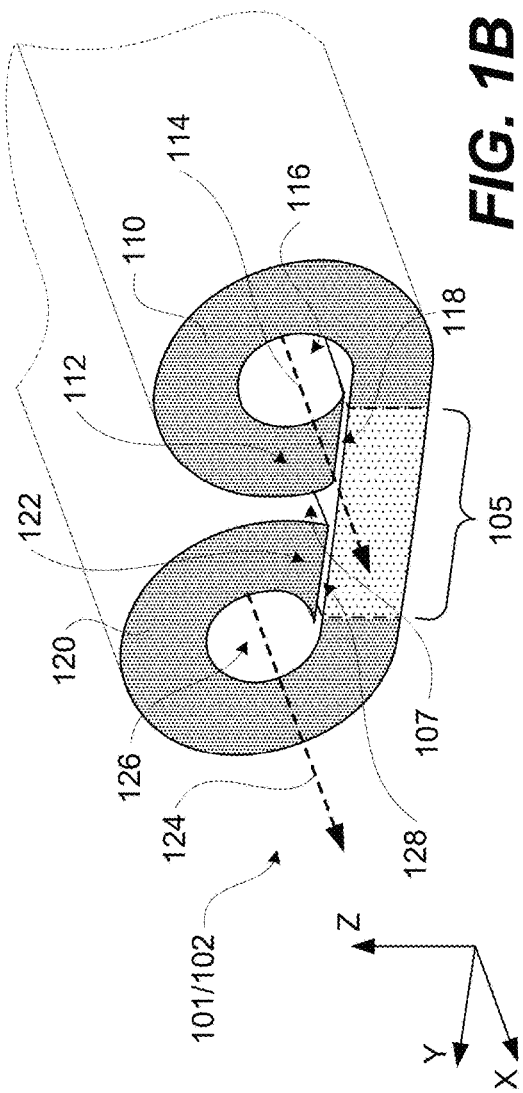

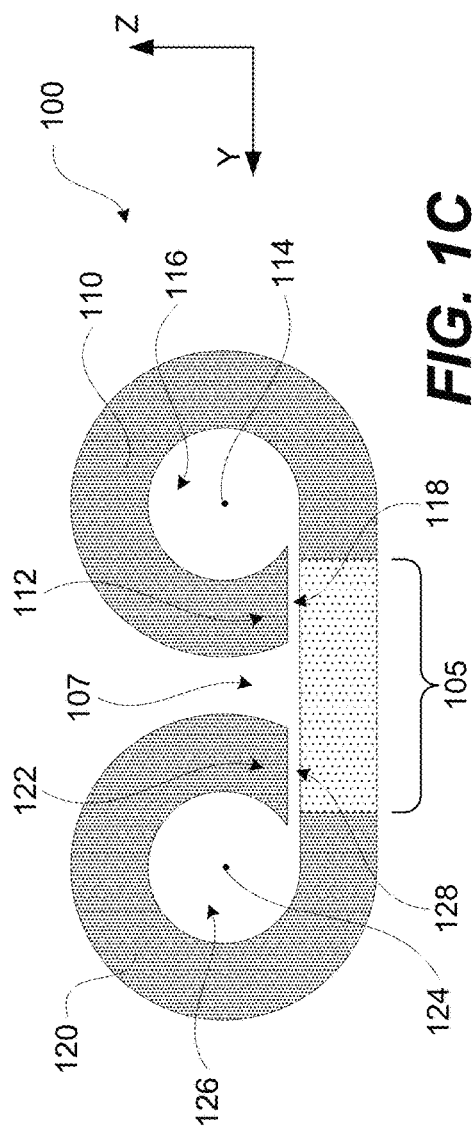
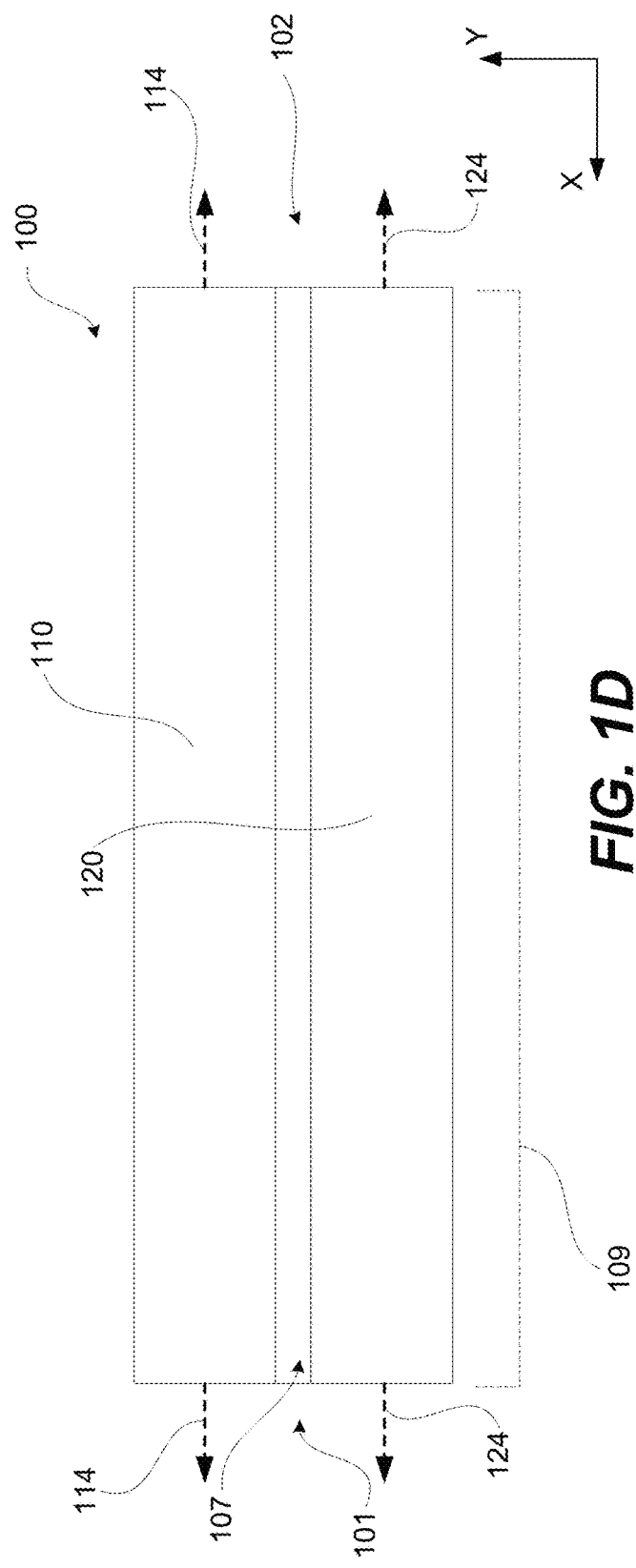
FIG. 1C
FIG. 1D

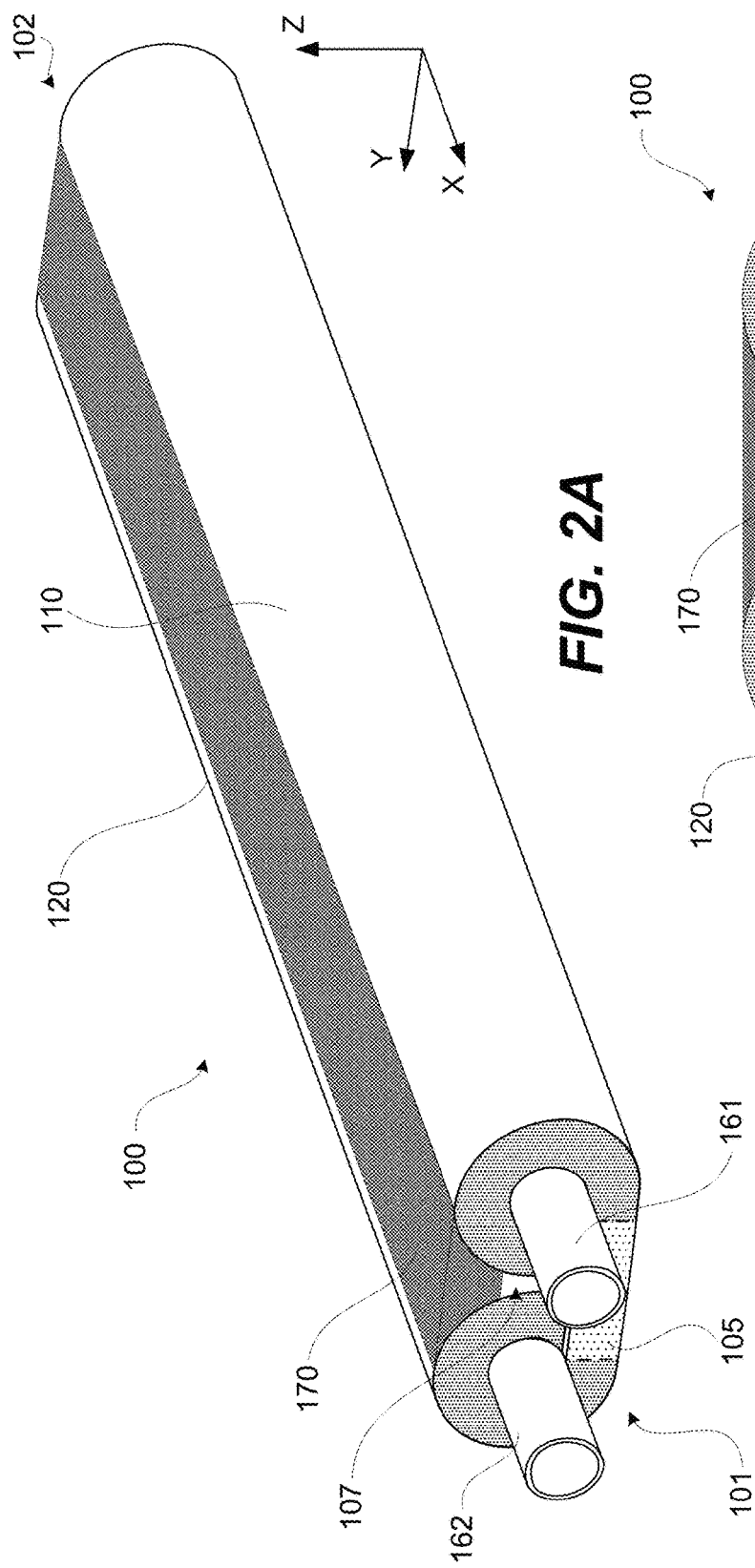
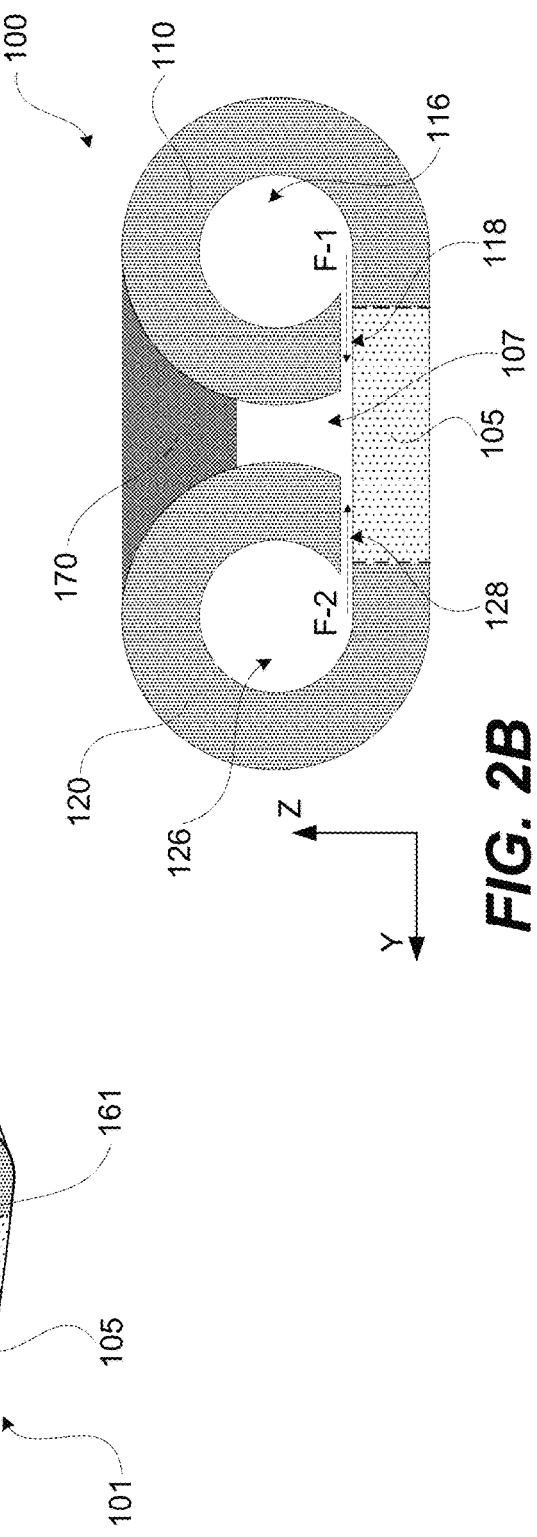
FIG. 2A
FIG. 2B

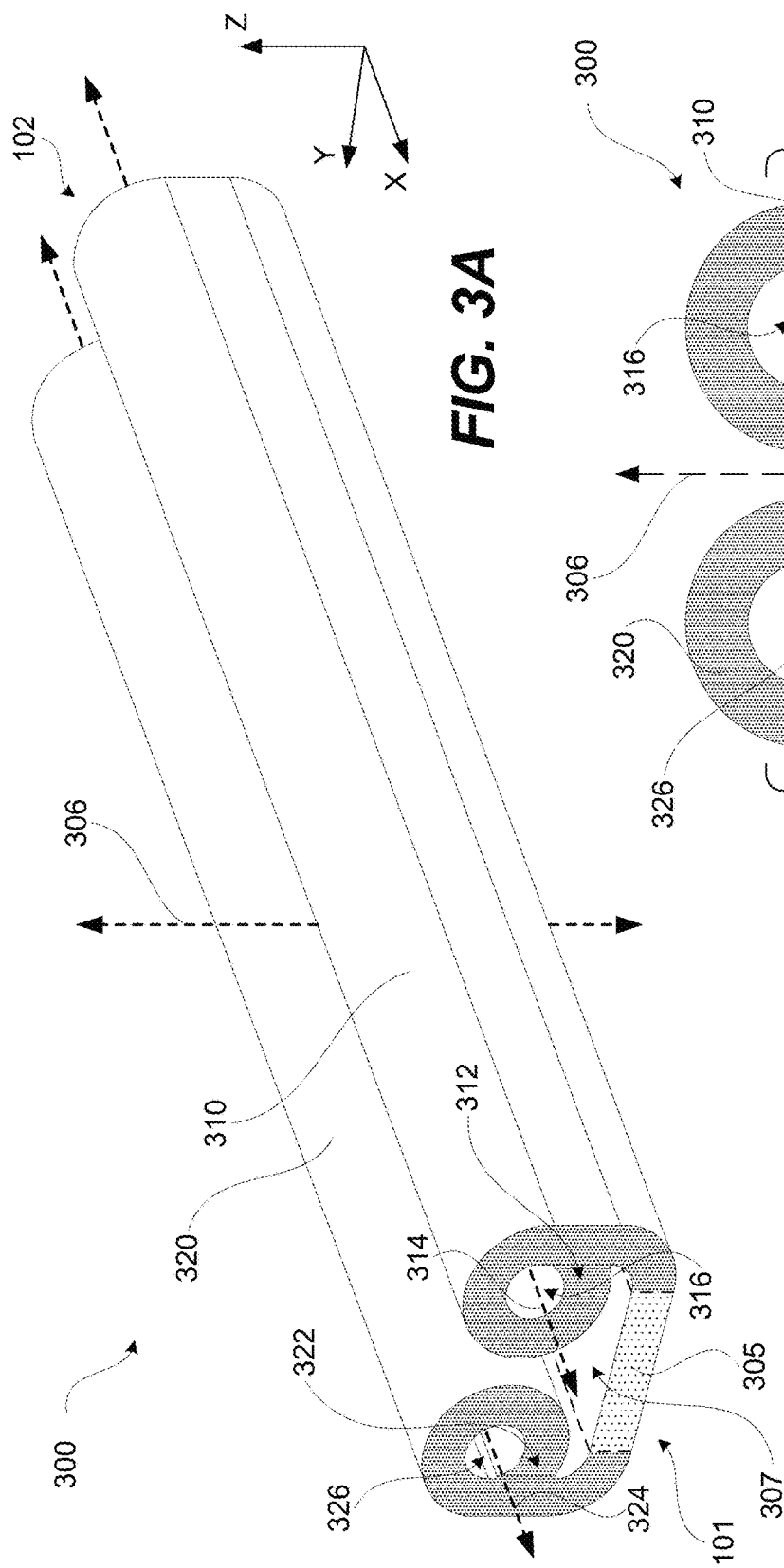
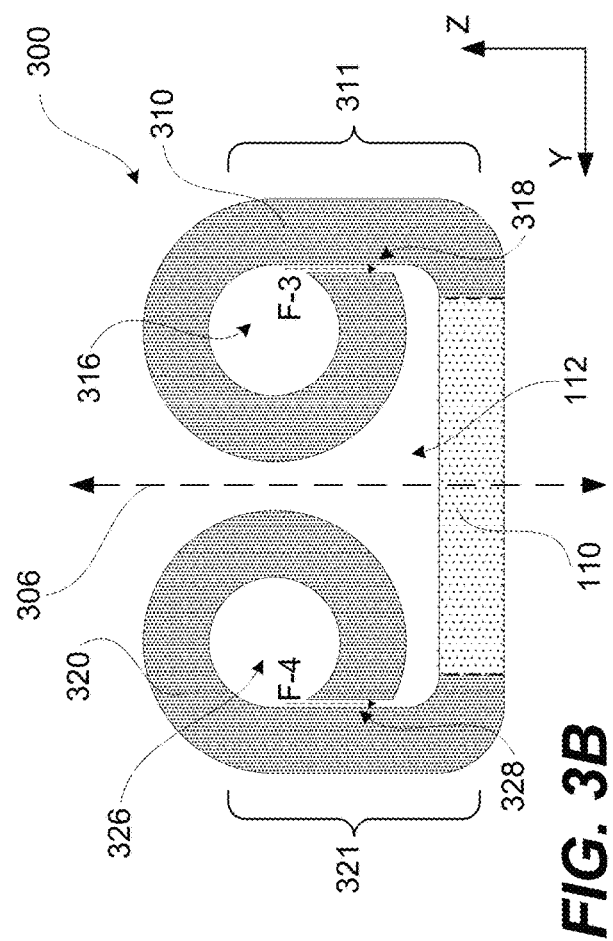
FIG. 3A
FIG. 3B

SYSTEMS AND METHODS FOR INSULATION OF AIRCRAFT COOLING SYSTEMS

CROSS-REFERENCE TO RELATED APPLICATIONS

This application is a continuation of U.S. patent application Ser. No. 15/592,920 entitled: "SYSTEMS AND METHODS FOR INSULATION OF AIRCRAFT COOLING SYSTEMS" filed on May 11, 2017, which is incorporated herein by reference in its entirety for all purposes.

BACKGROUND

Excessive heat can compromise the reliability of a system. Liquid cooling is an effective way to remove high heat loads from components, such as electrical and/or mechanical components in an aircraft. An integrated cooling system may consist of a series of pumps, heat exchangers, and pipes, tubes, or hoses. Thermal insulation may improve the efficiency of the cooling system by preventing undesired heat loss or gain in particular locations. Current methods and systems of insulating the components of an integrated cooling system comprise fully encasing portions of the pipes, tubes, or hoses in cylindrical sleeves of thermal insulating material. However, installation and removal of such sleeves are complicated and labor intensive requiring feeding the cylindrical sleeve down the length of tubing, which can result in build time and part cost during installation and/or maintenance. Furthermore, current insulating sleeves are sealed vessels, which can lead to retention of moisture and lead to corrosion of the tubing. Thus, there is a need for an improved mechanism of insulating aircraft cooling system tubing that allows easier installation and removal, while preventing sustained contact of moisture with the tubing.

SUMMARY

The following presents a simplified summary of the disclosure in order to provide a basic understanding of certain embodiments of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

Provided are insulating apparatuses for thermal insulation of tubing of an aircraft integrated cooling system and drainage of condensate or leakage produced by such tubing. In some examples, an insulating apparatus comprises an elongated strip including a first end and a second end. The insulating apparatus further comprises a medial portion running along the length of the elongated strip from the first end to the second end, a first edge from the first end to the second end, and a second edge from the first end to the second end. The first edge curls around a first longitudinal axis toward the medial portion to form a first wrap portion with a first cavity defined by an interior surface of the first wrap portion. The second edge curls around a second longitudinal axis toward the medial portion to form a second wrap portion with a second cavity defined by an interior surface of the second wrap portion.

The insulating apparatus further comprises a channel above the medial portion. The channel may be defined by an exterior surface of each of the first wrap portion and the second wrap portion. The first cavity and the second cavity are interconnected with the channel through a first gap and a second gap, respectively.

The first cavity may be configured to surround a first tube and the second cavity may be configured to surround a second tube. A heat transfer fluid may flow through the first tube and the second tube. The first wrap portion may be flexed to expand the first gap such that the first tube is inserted into the first cavity through the first gap. Similarly, the second wrap portion is flexed to expand the second gap such that the second tube is inserted into the second cavity through the second gap. A cross-sectional profile of the first cavity may correspond to a cross-sectional profile of the first tube, and a cross-sectional profile of the second cavity may correspond to a cross-sectional profile of the second tube.

The first gap and the second gap may be configured to allow liquid within the first cavity and the second cavity to drain to the channel, respectively. The medial portion may be angled such that liquid within the first cavity and the second cavity collects at the channel at the center of the medial portion. Alternatively, liquid within the first cavity and the second cavity may be caused to flow through the first gap and the second gap, respectively, by attitude changes.

The insulating apparatus may further comprise a cover member coupled to the first wrap portion and the second wrap portion such that the channel is enclosed within the cover member, the medial portion, the first wrap portion, and second wrap portion.

The insulating apparatus may further comprise a third edge from the first end to the second end, wherein the third edge extends from a portion of the first wrap portion and wraps around a third longitudinal axis toward the medial portion to form a third wrap portion with a third cavity defined by an interior surface of the third wrap portion.

Other implementations of this disclosure include systems and methods corresponding to the described apparatus. For instance, a system is provided in another aspect, which may include at least a portion of the subject matter of any of the preceding and/or following examples and aspects, a system which comprises a first tube and a second tube configured to transport a heat transfer fluid. The system further comprises a drainage container, and an insulating apparatus surrounding the first tube and the second tube. The first tube may be located within the first cavity, and the second tube may be located within the second cavity. Liquid produced by the first tube and the second tube may flow through the first gap and the second gap, respectively, and may be collected at the channel to be transported to the drainage container.

A plurality of insulating apparatuses may each surround a portion of the first tube and the second tube. The first tube and the second tube may be located at the exterior of a curved surface that encloses a portion of an interior volume of an aircraft.

Also provided is a method of operating an insulating apparatus. The method comprises wrapping a first tube and a second tube of a cooling system within the insulating apparatus. A heat transfer fluid may flow through the first tube and the second tube. Wrapping the first tube includes flexing the first wrap portion to expand the first gap to insert the first tube into the first cavity through the first gap, and wrapping the second tube includes flexing the second wrap portion to expand the second gap to insert the second tube into the second cavity through the second gap.

The method may further comprise flowing liquid produced by the first tube from the first cavity through the first gap and flowing liquid produced by the second tube from the second cavity through the second gap. The liquid within the first cavity and the second cavity may be caused to flow through the first gap and the second gap, respectively, by attitude changes.

The method may further comprise collecting the liquid at the channel, and transporting the liquid to a desired location. Transporting the liquid may include flowing the liquid to the desired location via the channel. The method may further comprise enclosing the channel with a cover member coupled to the first wrap portion and the second wrap portion.

Also provided is a method for draining condensate. The method may comprise a first operation level having a first condensate producing level. The method may further comprise a second operation level having a second condensate producing level that is higher than the first condensate producing level. Condensate may then be drained from a tube during the second operation level.

The tube may be wrapped within the described insulating apparatus. The tube may be located within the first cavity. Alternatively, the tube may be located within the second cavity. The condensate from the tube may be drained by flowing the condensate produced by the tube in the first cavity through the first gap, collecting the condensate at the channel, and transporting the condensate to a desired location.

An integrated cooling system of an aircraft may pump a heat transfer fluid through the tube. The tube may be located on the exterior of a curved surface and extend to at least a location in the midpoint or lower hemisphere of the curved surface. The curved surface may enclose an interior volume of an aircraft.

The features and functions that have been discussed can be achieved independently in various examples or may be combined in yet other examples further details of which can be seen with reference to the following description and drawings.

BRIEF DESCRIPTION OF THE DRAWINGS

FIGS. 1A-1D are schematic perspective views of an insulating apparatus, in accordance with one or more embodiments.

FIGS. 2A-2B are schematic perspective views of an insulating apparatus with a cover member, in accordance with one or more embodiments.

FIGS. 3A-3B are schematic perspective views of another configuration of an insulating apparatus, in accordance with one or more embodiments.

DETAILED DESCRIPTION

Figure 4:
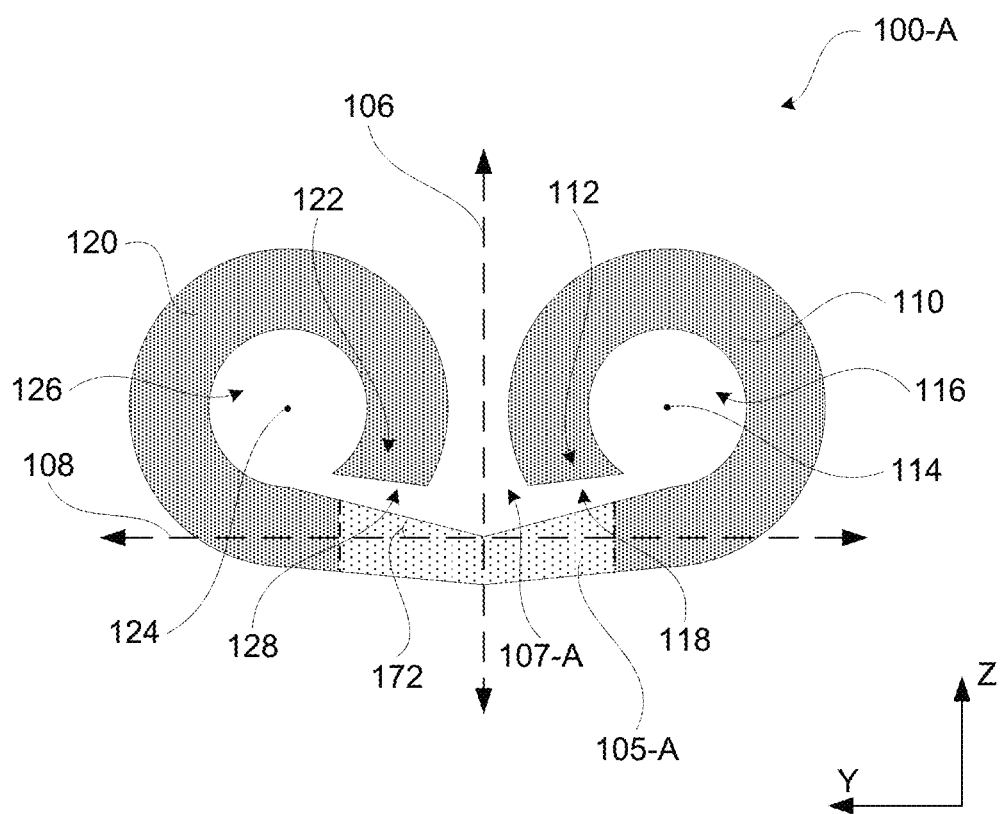
FIG. 4 is a schematic side view of an insulating apparatus with an angled channel portion, in accordance with one or more embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting. On the contrary, it is intended to cover alternatives, modifications, and equivalents as may be included within the spirit and scope of the present disclosure as defined by the appended claims.

For example, the techniques of the present disclosure will be described in the context of particular aircraft structures, such as an integrated cooling system (ICS). However, it should be noted that the techniques and mechanisms of the present disclosure may apply to cooling systems, and piping and/or tubing, of various other vehicle types or building structures. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure. Various techniques and mechanisms of the present disclosure will sometimes be described in singular form for clarity. However, it should be noted that some embodiments include multiple iterations of a technique or multiple instantiations of a mechanism unless noted otherwise.

Introduction

The present disclosure describes a novel insulating apparatus for insulation of tubing of an integrated cooling system (ICS) of an aircraft or various other vehicles or industrial systems. Such tubing may transport various heat transfer fluids for cooling and/or heating various mechanical and/or electrical components. The insulating apparatus is configured wrap around the tubes and provide thermal insulation to reduce and/or minimize heat transfer to and/or from the tubing and heat transfer fluid therein. The insulating apparatus may comprise two or more wrap portions. Each wrap portion may be flexed to expand a connecting gap such that a tube may be inserted into the cavity of the wrap portion through the gap. In various embodiments, the insulating apparatus may be manufactured from Polyvinylidene Fluoride (PVDF) foam, which provides the desired flexibility and thermal insulating properties.

Such configuration provides an insulation profile that allows easier installation by allowing the insulation apparatus to wrap around tubing without dismantling tube assemblies or destroying the insulation apparatus. The insulation is also easier to remove for inspection and maintenance of the ICS tubing. Current methods and systems of insulating the components of an integrated cooling system comprise fully encasing portions of the pipes, tubes, or hoses in cylindrical sleeves of thermal insulating material. However, installation and removal of such sleeves are complicated and labor intensive requiring feeding the cylindrical sleeve down the length of tubing, which can result in build time and part cost during installation and/or maintenance.

The apparatus is further configured to allow liquid, such as condensation or leakage, produced from the tubing to be collected and drained away from the tubing in order to prevent corrosion, molding, and other undesired effects of prolonged exposure to moisture. Current insulating sleeves are sealed vessels, which can lead to retention of moisture and lead to corrosion of the tubing. To avoid corrosion, current tubing may comprise of titanium, which can be costly.

The insulating apparatus described herein includes an open drain configuration with a channel to allow such liquid to move away from tubing and toward drainage container locations. Liquid flows from the cavity surrounding the tubing to the channel through the connecting gaps. The liquid may be caused to flow through the connecting gaps by attitude changes of the aircraft, for example roll, pitch, and yaw movements. A cover piece can be placed on channel to prevent spraying or splashing of liquid within the channel. In some embodiments, the liquid may be forced out of the surrounding cavities by pressure changes caused by altitude changes. Additionally, and/or alternatively, the shape of the insulating apparatus may form an angled trough that causes the flow of liquid out of the surrounding cavities. Implementation of the insulating apparatus described herein prevents sustained contact of the tubing with moisture. This may allow the use of aluminum tubing with reduced risk of corrosion, as well as weight and cost savings.

In various embodiments, ICS tubing may run along the crown of the aircraft which may enclose a portion of the interior of the aircraft. However, the ICS tubing may be located at any of various portions of the airframe of the aircraft where mechanical and/or electrical components requiring cooling. A plurality of insulating apparatuses may be used to wrap around multiple portions of one or more tubes. In some embodiments, the tubing may be curved to correspond to the shape of the surfaces of the airframe. In some embodiments, the insulating apparatus may be curved to correspond to the configuration of the tubing.

Apparatus Examples

The configuration and components of an insulating apparatus are described with reference to FIGS. 1A-ID, which illustrate schematic perspective views of an insulating apparatus, in accordance with one or more embodiments. According to various embodiments, apparatus 100 comprises an elongated strip including a first end 101 and a second end 102. FIG. 1B illustrates a close up view of first end 101 of the perspective view of apparatus 100 shown in FIG. 1A. In various embodiments, first end 101 may be identical to second end 102 and FIG. 1B may alternatively depict a close up view of second end 102. As depicted in FIGS. 1A and 1B, apparatus 100 may be defined by a longitudinal axis (X-axis), a lateral axis (Y-axis), and a vertical axis (Z-axis). In some embodiments, the elongated strip of apparatus 100 may include a length 109 from the first end 101 to the second end 102 along the X-axis. The length 109 of apparatus 100 may vary in various embodiments. For example, length 109 of apparatus 100 may be approximately 1 meter in length. However, in some embodiments, shorter lengths 109 may be implemented, such as 1-2 feet. In some embodiments, multiple apparatuses 100 may be used to wrap around multiple portions of tubing of an aircraft cooling system.

In various embodiments, the elongated strip of apparatus 100 comprises a medial portion 105 running along the length 109 of the elongated strip from the first end 101 to the second end 102. The apparatus 100 may further comprise a first wrap portion 110 and a second wrap portion 120. As shown in FIGS. 1A-IC, first wrap portion 110, second wrap portion 120, and medial portion 105 are distinguished by shading at the first end 101 of apparatus 100. However, it should be understood that each portion includes the respective shaded area and runs along the length 109 from the first end 101 to the second end 102.

In some embodiments a first edge 112 of the elongated strip from the first end 101 to the second end 102 curls around a first longitudinal axis 114 toward the medial portion 105 to form first wrap portion 110. In some embodiments, a second edge 122 of the elongated strip from the first end 101 to the second end 102 curls around a second longitudinal axis 124 toward the medial portion 105 to form second wrap portion 120. In various embodiments, first longitudinal axis 114 and second longitudinal axis 124 are parallel to the X-axis.

With reference to FIG. 1D, shown is a top-down view of apparatus 100. For the purposes this disclosure, the side toward which each of edge 112 and edge 122 wrap may be referred to as the "top," while the opposite side may be referred to as the "bottom." However, it should be recognized that apparatus 100 may be arranged in various directional orientations when implemented in an aircraft integrative cooling system. When viewed directly from the first end, as shown in FIG. 1C, first edge 112 may wrap upward in a counterclockwise direction around longitudinal axis 114, while second edge 122 may wrap upward in a clockwise direction around second longitudinal axis 124. In various embodiments, the top side may correspond to an interior surface of the apparatus 100, while the bottom side may correspond to an exterior surface of the apparatus 100. As shown in FIGS. 1A-ID, the interior surface of medial portion 105 of apparatus 100 may be horizontal and substantially parallel to an X-Y plane.

Each of the first wrap portion 110 and second wrap portion 120 may include a cavity. A first cavity 116 is defined by an interior surface of first wrap portion 110, while a second cavity 126 is defined by an interior surface of second wrap portion 120. In some embodiments, first cavity 116 may be centered or substantially centered about first longitudinal axis 114. In some embodiments, second cavity 126 may be centered or substantially centered about second longitudinal axis 124.

In various embodiments, the elongated strip of apparatus 100 further comprises a channel 107. In some embodiments, channel 107 is located above medial portion 105 and is defined by the exterior surfaces of each of the first wrap portion 110 and the second wrap portion 120. As shown in FIG. 1C, channel 107 is defined by the substantially vertical portions of the exterior surfaces of each of the first wrap portion 110 and the second wrap portion 120. As shown in FIG. 1D, channel 107 may run the length 109 of apparatus 100 from first end 101 to second end 102. In some embodiments, first cavity 116 and second cavity 126 are interconnected with channel 107 through a first gap 118 and a second gap 128, respectively. First gap 118 may be formed between first edge 112 and the top side and/or interior surface of medial portion 105, while second gap 128 may be formed between second edge 122 and the top side and/or interior surface of medial portion 105. In some embodiments, first edge 112 and second edge 122 are horizontal surfaces that are substantially parallel to the Y-axis. Furthermore, the interior surface of medial portion 105 may also be a horizontal surface that is substantially parallel to the Y-axis. Thus, gaps 118 and 128 may be substantially horizontal spaces relative to the Y-axis, as shown in FIGS. 1A-ID. In various embodiments, liquid within cavities 116 and 126 may drain to channel 107 through gaps 118 and 128, respectively.

In various embodiments, apparatus 100 is a monolithic structure. In some embodiments, apparatus 100 may be constructed by cutting, sculpting, sanding, or other machining processes. In some embodiments, apparatus 100 may be constructed by various additive manufacturing processes, including Binder Jetting, Directed Energy Deposition, Material Extrusion, Material Jetting, Powder Bed Fusion, Sheet Lamination, and/or Vat Photopolymerization. For example, fused deposition modeling may be used to extrude thermoplastic material into the desired configuration described herein.

In other embodiments, apparatus 100 may comprise a plurality of pieces that are combined by attachment methods, such as heat welding, adhesion, mechanical interlocking, or other appropriate attachment method that provides the desired watertight seal, airtight seal, and/or thermal insulation characteristics. In some embodiments, apparatus 100 comprises Polyvinylidene Fluoride (PVDF) foam. In other embodiments, apparatus 100 may comprise other non-reactive thermoplastic material. In various embodiments, apparatus 100 may comprise of any combination of various materials that may provide the desired flexibility and/or thermal insulation properties. PVDF foam may provide apparatus 100 with the desired flexibility and/or thermal insulation properties. The flexibility of apparatus 100 may permit easier installation and/or removal of apparatus 100.

In some embodiments, such as depicted in FIGS. 1A-1D, channel 107 may be opened and/or exposed toward the top side of apparatus 100. However, in some embodiments, channel 107 may be enclosed by a cover member 170. FIGS. 2A-2B illustrate schematic perspective views of an insulating apparatus 100 with a cover member 170, in accordance with one or more embodiments. Such cover member 170 may prevent spraying and/or splashing of liquid within channel 107, such as during movement of the aircraft.

As shown in FIGS. 2A-2B, cover member 170 may be coupled to first wrap portion 110 and second wrap portion 120 of apparatus 100, such that channel 107 is enclosed by cover member 170, the interior surface of medial portion 105, and the exterior surfaces of first wrap portion 110 and second wrap portion 120. In some embodiments, cover member 170 may be attached to apparatus 100 by adhesion, heat welding, and/or mechanical connection. For example, several interlocking notches and protrusions may be included on cover member 170, first wrap portion 110, and/or second wrap portion 120, which allow cover member 170 to securely attach to first wrap portion 110 and second wrap portion 120. In some embodiments, cover member 170 may form a watertight seal to prevent any liquid from escaping from channel 107. In some embodiments, cover member 170 may also comprise PVDF foam.

According to various embodiments, first cavity 116 of first wrap portion 110 and second cavity 126 of second wrap portion 120 are configured to surround tubing or piping. Such tubing or piping may be part of an integrated cooling system of an aircraft or other vehicle that employs liquid cooling. As used herein, the terms "tube," "tubes," and "tubing" refer to tubing, piping, hoses, or other cylindrical structures used to transport liquid in a cooling system of an aircraft or other vehicle or machine.

As shown in FIG. 2A, a first tube 161 is within first cavity 116 and a second tube 162 is within second cavity 126. In some embodiments, tubes 161 and 162 may be comprise titanium, aluminum, or any other material with desired strength, weight, and corrosion characteristics, such as metals and plastics. Tubes 161 and 162 may vary in size in various embodiments. For example, tubes 161 and 162 may include a diameter of approximately 1 inch.

In some embodiments, a heat transfer fluid may flow through the tubes 161 and 162. In some embodiments, such heat transfer fluid may be water. In other embodiments, the heat transfer fluid may comprise any fluid that meets the specific requirements and/or temperature performance of an application, such as an antifreeze mixture for freeze protection, such as ethylene glycol or propylene glycol. In various embodiments, different factors may be considered for the type of heat transfer fluid, such as specific heat capacity, thermal conductivity, temperature range, and toxicity. For example, for a nontoxic freeze protection, propylene glycol may be selected. However, for even lower temperatures, ethylene glycol may be selected if toxicity is not an issue. In warmer climates, water may be adequate as freeze protection. In some embodiments, tubes 161 and 162 may run near and/or come into thermal contact with electronic and/or mechanical components of an aircraft or other vehicle in order to absorb heat and cool down such components.

In various embodiments, tubes 161 and 162 may be inserted into apparatus through gaps 118 and 128, respectively. In other words, apparatus 100 may be wrapped around the tubes 161 and 162. For example, first wrap portion 110 may be flexed to expand first gap 118 such that first tube 161 may be inserted into first cavity 116 through the expanded first gap 118. Likewise, second wrap portion 120 may be flexed to expand second gap 128 such that second tube 162 may be inserted into second cavity 126 through the expanded second gap 128. In some embodiment, cover member 170 may then be attached to apparatus 100 after tubes 161 and 162 have been inserted. In some embodiments, apparatus 100 may be removed from tubes 161 and 162 by flexing the wrap portion 110 and 120 to withdraw tubes 161 and 162 from the respective cavities 116 and 126. In various embodiments, gaps 118 and 128 may be configured to expand to at least a greater size in distance than the outer diameter of tubes 161 and/or 162.

The various embodiments of apparatus 100 may be easily installed and or removed as described above. This is an improvement upon the functioning of current insulating sleeves, which are completely sealed vessels. As such, installation and removal of such sleeves are complicated and labor intensive requiring feeding the cylindrical sleeve down the length of tubing, which can result in build time and part cost during installation and/or maintenance. For example, a current insulating sleeve may need to be completely fed down the length of a portion of tubing before the tubing may be integrated into the cooling system. Furthermore, during maintenance or inspection of the tubing, the entire insulation sleeve must be removed, and may be destroyed in the process. To avoid destroying the insulating sleeve, a portion of the tube would need to be removed for inspection; however, this may increase labor time and cost. In contrast, apparatus 100 may be removed by slipping the tube out of the respective cavity through the respective gap during maintenance, and can be easily reinstalled afterwards.

Figure 5A:
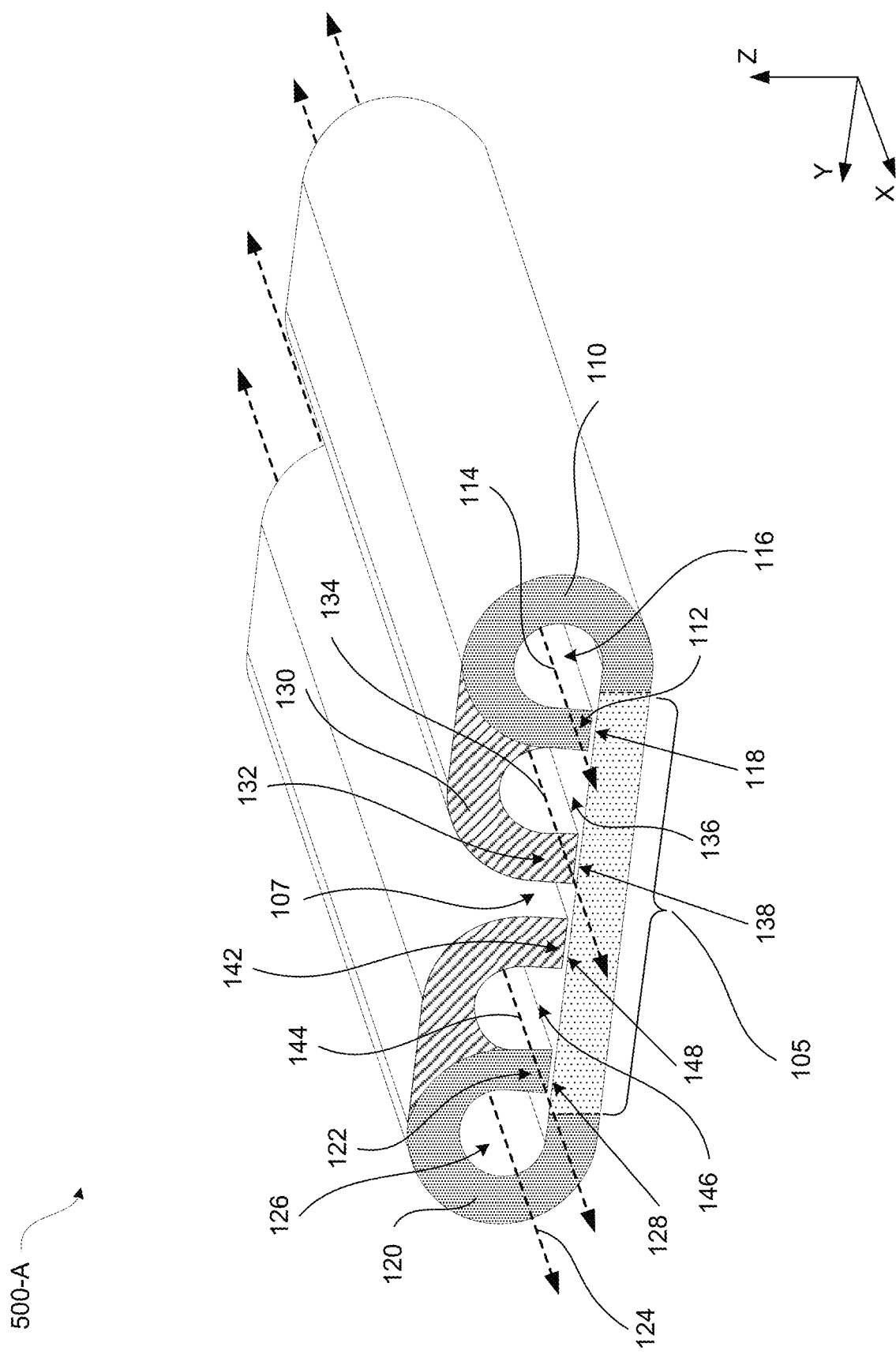
FIGS. 5A-5B are schematic perspective views of insulating apparatuses that include additional cavities, in accordance with one or more embodiments.
Figure 5B:
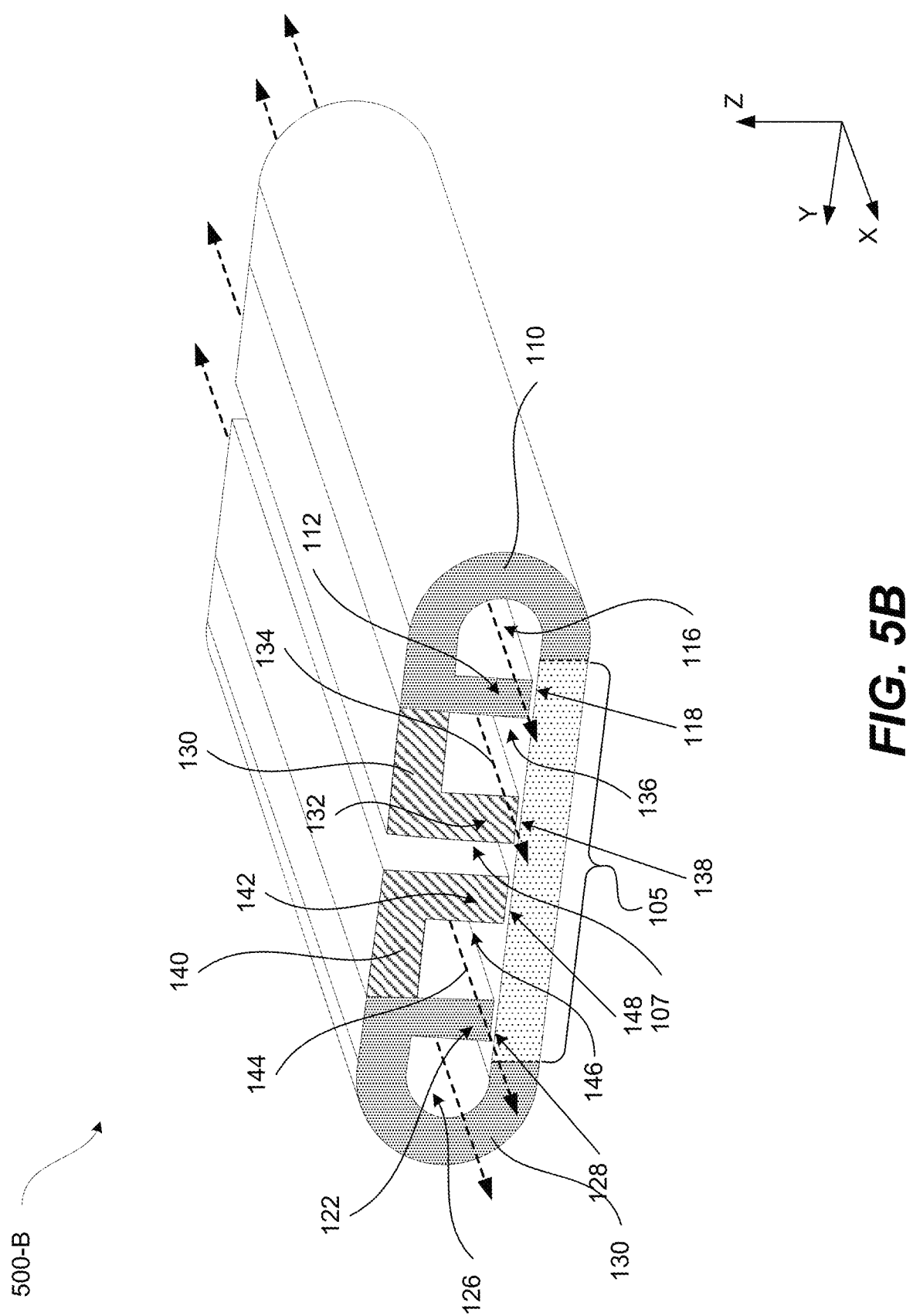

In some embodiments, cavities 116 and 126 of apparatus 100 may be configured to tightly enclose around the tubing 161 and 162 such that the interior surface of each wrap portion is in contact with the exterior surface of the respective tubes. In some embodiments, the material of apparatus 100 (such as PVDF foam) may be able to conform to the shape of the tube when the tube is inserted into the respective cavity. In some embodiments, there may be space within each cavity between at least a portion of tubes 161 and 162 and the interior surface wrap portions 110 and 120, respectively. As an example, the cross-sectional profile of first cavity 116 may correspond to a cross-sectional profile of first tube 161. As shown in FIG. 2A, first cavity 116 and tube 161 may each include a corresponding circular cross-sectional profile upon a plane that is parallel to a plane along the Y-axis and Z-axis. In some embodiments, first cavity 116 and second cavity 126 may include the same cross-sectional profile. However, first cavity and second cavity may have different cross-sectional profiles in various embodiments. For example, as shown in FIG. 5A, third cavity 536-A and fourth cavity 546-A include a circular cross-sectional profile with one flat side. Also, as shown in FIG. 5B, third cavity 536-B and fourth cavity 546-B include square cross-sectional profiles.

In some embodiments, apparatus 100 may be curved or bent along length 109 to correspond to any curvature or bends within the tubes. For example, portions of tubes 161 and 162 may be located within airframe 750 and may run along the exterior of a curved surface which encloses at least a portion of an interior volume (interior 770) of an aircraft, such as aircraft 700, further described in FIG. 7. For example, airframe 750 may have an exterior surface and an interior surface enclosing interior 770. Portions of tubes 161 and/or 162 may be located along the exterior of the interior surface of airframe 750 in between the interior surface and exterior surface of airframe 750.

In various embodiments, the curved surface may correspond to various portions of airframe 750. In some embodiments, the curved surface may correspond with the crown of aircraft 700. In some embodiments, the curved surface may correspond with the bilge. However, in various embodiments, the curved surface may correspond to any portion of the airframe 750. The tubes 161 and 162 may extend to at least a midpoint of the curved surface. For example, the tubes may extend from the top of the airframe 750 to the bottom of airframe 750. A portion of the tubing may include a curved shape to correspond to the curvature of airframe 750. Thus, an apparatus may be configured with a corresponding curvature for such portion of the tubing.

In various embodiments, gaps 118 and 128 allow liquid within first cavity 116 and second cavity 126 to drain to channel 107, respectively. In some embodiments, such liquid may be condensate formed by the condensation of air onto the cooler tubes 161 and 162 within cavities 116 and 126. In some embodiments, such liquid may be leakage from tubes 161 and/or 162 caused by cracks or other breakage. The liquid may be drained to channel 107 through gaps 118 and 128, as shown by arrows F-1 and F-2. In some embodiments, such liquid is caused to flow out of the cavities 116 and 126 by attitude changes of the aircraft. For example, aircraft movement including roll, pitch, and/or yaw movements may cause the liquid, which is acted upon by gravity, to flow to various portions within cavities 116 and 126 and eventually through gaps 118 and 128 into channel 107. In some embodiments, pressurization caused by altitude changes of the aircraft may also force liquid out of cavities 116 and 126.

FIGS. 3A-3B are schematic perspective views of another configuration of an insulating apparatus 300, in accordance with one or more embodiments. As shown in FIGS. 3A-3B, apparatus 300 includes first wrap portion 310 and second wrap portion 320 extending from opposite sides of medial portion 305. First wrap portion 310 may comprise first edge 312 curled around longitudinal axis 314, which is parallel to the X-axis. In some embodiments, first edge 312 is curled such that first wrap portion 310 includes a vertical portion 311 with interior and exterior surfaces that are substantially parallel to vertical axis 306, which is parallel to the Z-axis. First edge 312 may also curl such that first gap 318 is formed between first edge 312 and an interior surface of vertical portion 311. In some embodiments, first edge 312 is also substantially parallel to vertical axis 306, such that first gap 318 is a substantially vertical space.

Second wrap portion 320 of apparatus 300 may have a symmetrical configuration. In various embodiments, second wrap portion 320 comprises second edge 322 curled around longitudinal axis 324, which is parallel to the X-axis. In some embodiments, second edge 322 is curled such that second wrap portion 320 includes a vertical portion 321 with interior and exterior surfaces that are substantially parallel to vertical axis 306, which is parallel to the Z-axis. Second edge 322 may also curl such that second gap 328 is formed between second edge 322 and an interior surface of vertical portion 321. In some embodiments, second edge 322 is also substantially parallel to vertical axis 306, such that second gap 328 is a substantially vertical space.

Channel 307 may be defined by the interior surface of medial portion 305, portions of the interior surfaces of first wrap portion 310 and second wrap portion 320, as well as portions of the exterior surfaces of first wrap portion 310 and second wrap portion 320. As shown in FIGS. 3A-3B, channel 307 may be opened and/or exposed toward the top side of apparatus 300. However, a cover member, such as cover member 170 may be used to enclose channel 307. With such configuration, gaps 318 and 328 are substantially vertical and channel 307 may be wider along the Y-axis.

In various embodiments, gaps 318 and 328 allow liquid within first cavity 316 and second cavity 326 to drain to channel 107, respectively. In some embodiments, such liquid may be condensate formed by the condensation of air onto the cooler tubes 161 and 162 within cavities 316 and 326. In some embodiments, such liquid may be leakage from tubes 161 and/or 162 caused by cracks or other breakage. The liquid may be drained to channel 107 through gaps 318 and 328, as shown by arrows F-3 and F-4. In some embodiments, such liquid is caused to flow out of the cavities 316 and 326 by attitude changes of the aircraft. For example, aircraft movement, including roll, pitch, and/or yaw movements may cause the liquid, which is acted upon by gravity, to flow to various portions within cavities 316 and 326 and eventually through gaps 318 and 328 into channel 107, In some embodiments, pressurization caused by altitude changes of the aircraft may also force liquid out of cavities 316 and 326.

In other embodiments, the shape of the insulating apparatus may be utilized with gravity to direct the flow of the liquid through gaps 118 and 128. FIG. 4 is a schematic side view of an insulating apparatus 100-A with an angled medial portion 105-A, in accordance with one or more embodiments. In various embodiments, apparatus 100-A may comprise medial portion 105-A which is angled with respect to horizontal axis 108, which is parallel to the Y-axis. As shown in FIG. 4, the interior surface of medial portion 105-A is angled downward toward the center at each side of a vertical axis 106, which is parallel to the Z-axis. The angle of each side of medial portion 105-A forms an angle 172 with respect to a horizontal axis 108, which is parallel to the Y-axis. In various embodiments, angle 172 may be configured at any angle. For example, angle 172 may be at least five degrees. In some embodiments, angle 172 may be greater than 45 degrees. In some embodiments, each side of medial portion 105-A may include different angles. In some embodiments, the angle 172 of the interior surface of medial portion 105-A may vary along apparatus 100-A from first end 101 to second end 102.

In various embodiments, such configuration of medial portion 105-A forms a trough shape for channel 107-A. apparatus 100-A may be arranged such that gravity causes liquid within cavities 116 and 126 to flow out of gaps 118 and 128 toward the center of channel 107-A.

Because they are completely sealed vessels, existing insulating sleeves can lead to retention of moisture from fluids such as condensation and/or leakage of heat transfer fluid. Prolonged contact of such moisture with the tubing may lead to corrosion. Therefore, to resist such corrosion, tubes may be currently constructed from titanium, which may be more costly and heavier than other potential materials. Because of the open channel configuration of apparatuses 100 and 100-A, including channel 107 and 107-A, as well as gaps 118 and 128, fluids from condensation or leakage do not have sustained contact with the tubing. This prevents or minimizes the occurrence of corrosion, allowing the use of aluminum tubing for weight and cost savings. Furthermore, as previously described, the apparatuses described herein allow easier removal to clean or remove any remaining liquid without dismantling tube assemblies or destruction of the apparatus.

In some embodiments, an apparatus described herein, may include additional cavities and gaps to accommodate additional tubing. FIGS. 5A-5B are schematic perspective views of insulating apparatuses 500-A and 500-B that include additional cavities, in accordance with one or more embodiments. As shown in FIGS. 5A-5B, apparatuses 500-A and 500-B include medial portion 105 and first and second wrap portions 110 and 120, as previously described in FIGS. 1A-1D. apparatuses 500-A and 500-B further include a third wrap portion 130 which is formed from third edge 132 which wraps around third longitudinal axis 134. Third edge 132 may reach from first end 101 to second end 102 and may extend from a portion of first wrap portion 110. Third wrap portion 130 includes third cavity 136 which is defined by an interior surface of third wrap portion 130. In some embodiments, apparatuses 500-A and 500-B may further include fourth wrap portion 140 formed from fourth edge 142 which wraps around fourth longitudinal axis 144. Fourth edge 142 may reach from first end 101 to second end 102 and may extend from a portion of second wrap portion 120. Fourth wrap portion 140 includes fourth cavity 146 which is defined by an interior surface of fourth wrap portion 140.

In some embodiments, third gap 138 and fourth gap 148 are located between medial portion 105 and third edge 132 and fourth edge 142, respectively. As depicted in FIGS. 5A-5B, channel 107 is defined by an exterior surface of each of the third wrap portion 130 and fourth wrap portion 140. In some embodiments, cover member 170 may be attached to wrap portions 130 and 140 to enclose channel 107. As previously described, each cavity within an apparatus may include any cross-sectional shape.

In various embodiments, an apparatus may have any number of wrap portions with cavities to accommodate various configurations of tubing within a cooling system. However, in some embodiments, at least two wrap portions, such as first wrap portion 110 and second wrap portion 120, must be included in order to form channel 107.

Method of Operation

Figure 6A:
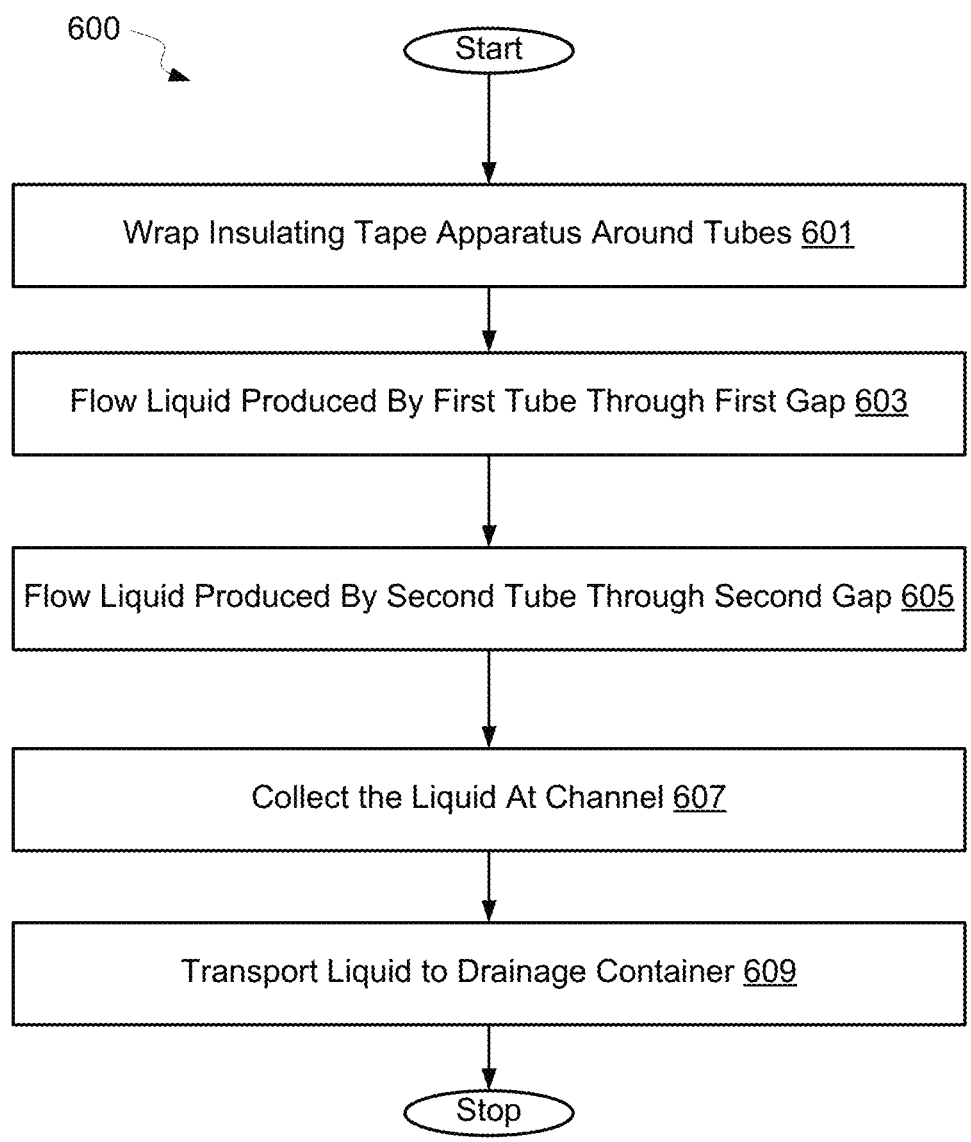
FIG. 6A illustrates an example method for operating an insulating apparatus, in accordance with one or more embodiments.

Also provided are methods of operating an insulating apparatus and draining condensate. With reference to FIG. 6A, shown is a method 600 of operating an insulating apparatus, in accordance with one or more embodiments. At operation 601, an insulating apparatus is wrapped around tubes of a cooling system. In various embodiments, the insulating apparatus may be apparatus 100, or any other apparatus described herein. In some embodiments, the cooling system may be an integrated cooling system of an aircraft with a system of tubes and/or piping, such as first tube 161 and second tube 162.

For example, apparatus 100 may be wrapped around first tube 161 and second tube 162. In various embodiments, wrapping the apparatus around the tubes may include flexing the first wrap portion 110 of apparatus 100 to expand the first gap 118 to insert the first tube 161 through the first gap 118 into the first cavity 116. Wrapping the apparatus around the tubes may further include flexing the second wrap portion 120 of apparatus 100 to expand the second gap 128 to insert the second tube 162 through the second gap 128 into the second cavity 126. In various embodiments, multiple apparatuses may be used to wrap multiple portions of the first and second tubes.

As previously described, the cross-sectional profile of the cavities of the apparatus may correspond to the cross-sectional profile of the tubes, allowing a tight fit around the tubes. Once wrapped, the tubes of a cooling system may be thermally insulated to prevent heat transfer from the environment. A heat transfer fluid may flow through the first tube 161 and the second tube 162. As previously described, the heat transfer fluid may comprise water, ethylene glycol, or propylene glycol.

Liquid produced by the first tube is flowed through a first gap of the apparatus at operation 603, and liquid produced by the second tube is flowed through a second gap of the apparatus at operation 605. In some embodiments, the liquid produced by the first and second tubes may be condensate caused by the condensation of surrounding air onto the tubes. Alternatively, and/or additionally, the liquid produced by the first and second tubes may be heat transfer fluid that escapes one or more of the tubes due to leakage or breakage in the tubes.

At operation 607, the liquid is collected at a channel, such as channel 107. In various embodiments, the liquid may be caused to flow through the first and second gaps by attitude changes of the aircraft. Additionally, pressurization changes due to altitude changes of the aircraft, which may force the liquid out of the respective cavities and into channel 107. However, as previously described, in some embodiments, the medial portion 105 of apparatus 100 may be angled downward relative to a horizontal axis 108, such as medial portion 105-A in FIG. 4. This downward angle may allow the liquid to flow toward the channel 107 by the force of gravity. In some embodiments, method 600 may further comprise enclosing the channel 107 with a cover member 170, as described above, to prevent escape of the liquid from channel 107.

The liquid may then be transported to a desired location at operation 609. In some embodiments, transporting the liquid includes flowing the liquid to the desired location via the channel 107. In some embodiments, the desired location includes a drainage container of an integrated cooling system, such as cooling system 760 described with reference to FIG. 7. Alternatively, the desired location may be a fluid recycler, which may redirect the heat transfer fluid back through the cooling system.

Figure 6B:
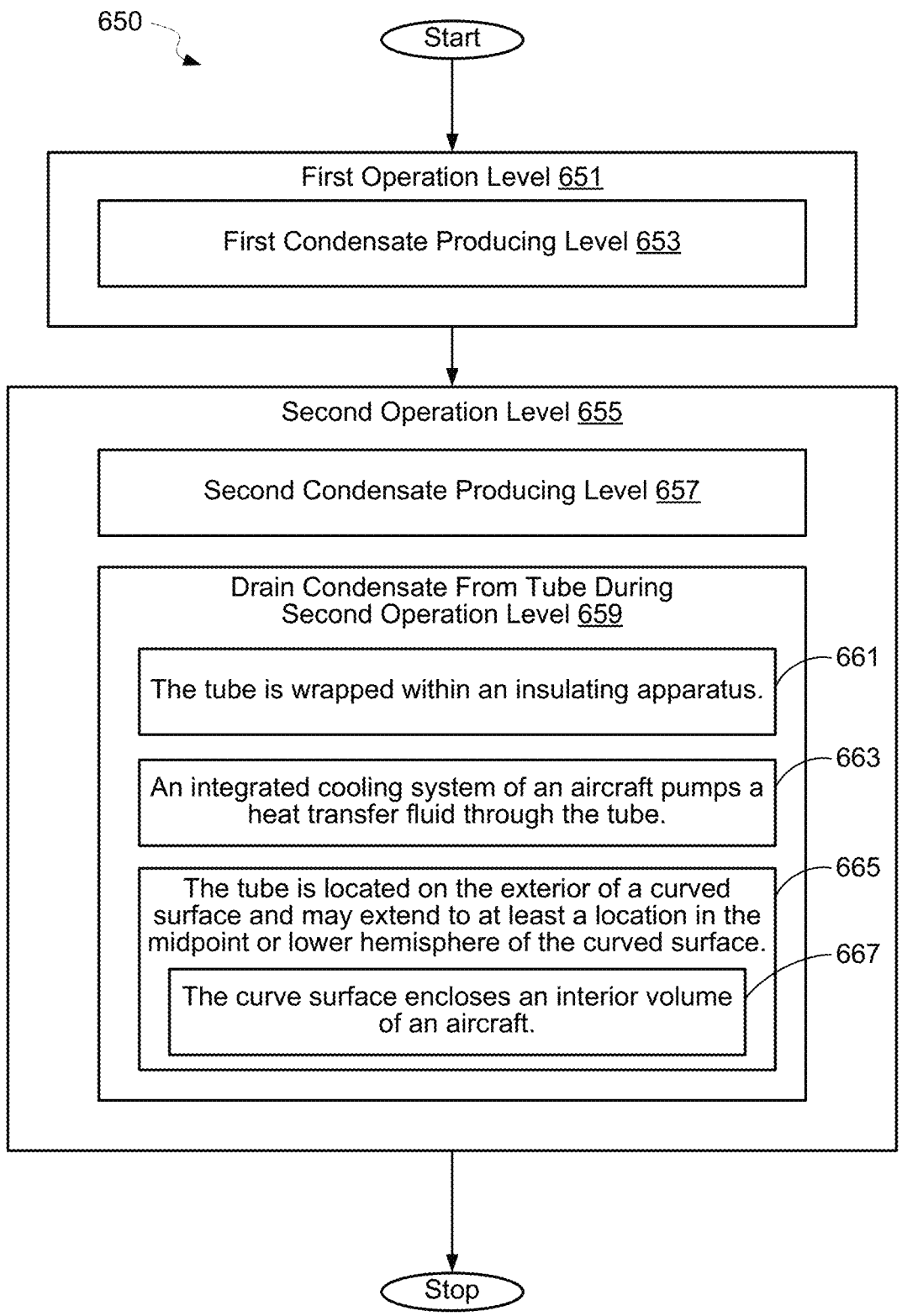
FIG. 6B illustrates an example method for draining condensate, in accordance with one or more embodiments.

With reference to FIG. 6B, shown is a method 650 for draining condensate. In various embodiments, method 650 includes a first operation level 651 having a first condensate producing level 653. First operation level 651 may correspond to an off condition of an integrated cooling system of an aircraft. The integrated cooling system may be in an off condition when the aircraft is powered down and/or when energy/power usage by the aircraft is low. This may occur during an operational mode of the aircraft, which may comprise one or more of the following operational states: power on, pre-flight, engine start, in-gate, taxi-out, takeoff, initial climb, climb, enroute cruise, descent, approach land, rollout, taxi-in, go around, and engine shutdown. In some embodiments, the integrated cooling system may be operational during first operational level 651, but the heat transfer fluid is not being actively cooled and/or the heat transfer fluid is being pumped through the system at a lower rate or a zero rate, which minimizes the cooling and/or heating effect of the heat transfer fluid.

During the first operation level 651 of the integrated cooling system, little or no heat is being produced by mechanical and/or electronic components of the aircraft, and thus, cooling may not be necessary. Because little or no cooling effect is occurring during first operation level 651, first condensate producing level 653 may correspond to little or no condensation being produced. The lower temperature differential between the higher temperature of the tubes and heat transfer fluid and the lower temperature of the surrounding environment may result in reduced formation of condensation.

Method 650 may also include a second operation level 655 having a second condensate producing level 657 that is higher than the first condensate producing level. The second operation level 655 may correspond to an on condition of the integrated cooling system. The second operation level 655 may be implemented during an operational mode of the aircraft, which may comprise one or more of the following operational states: power on, pre-flight, engine start, in-gate, taxi-out, takeoff, initial climb, climb, enroute cruise, descent, approach land, rollout, taxi-in, go around, and engine shutdown.

In various embodiments, the amount of condensation being produced in second condensate producing level 657 is greater than first condensate producing level 653. During second operation level 655, the heat transfer fluid may be actively cooled and/or pumped through the tubing by the integrated cooling system to cool the various mechanical and electronic components. The increased temperature differential between the cooled tubing and the warmer surrounding environment may cause increased moisture to condense on the tubing resulting in increased condensate.

First operation level 651 and/or second operation level 655 may also occur during a maintenance mode and/or a data load mode of the aircraft. In some embodiments, during any one of the operation mode, maintenance mode, or data load mode of the aircraft, a sensor may automatically alternate between first operation level 651 and second operation level 655 based on a measured temperature of the integrated cooling system, or any other system in the aircraft. In some embodiments, the integrated cooling system may be manually alternated between first operation level 651 and second operation level 655. For example, the system may be manually switched from first operation level 651 to second operation level 655, or vice versa, during maintenance or testing of the aircraft systems.

Condensate is drained (659) from a tube during the second operation level 655. In some embodiments, the tube may be any one of the first tube 161 or the second tube 162. In various embodiments, the tube is wrapped (661) within an insulating apparatus. For example, the tube may be wrapped (661) within an insulating apparatus 100, as previously described with reference to operation 601 in method 600. Specifically, the tube may be located within the first cavity 116 of first wrap portion 110. However, the tube may alternatively be located within the second cavity 126 of second wrap portion 120. In some embodiments, there may be two tubes, one located in first cavity 116 and one located in second cavity 126.

In various embodiments, the condensate from the tube is drained by flowing the condensate produced by the tube through a gap in the insulating apparatus 100. For example, condensate produced by the tube in the first cavity may be flowed through the first gap, such as in operation 603. As another example, condensate produced by the tube in the second cavity may be flowed through the second gap, such as in operation 605. The condensate may then be collected at the channel, such as in operation 607. The condensate may then be transported to a desired location, such as in operation 609.

In some embodiments, an integrated cooling system of an aircraft pumps (663) a heat transfer fluid through the tube. In some embodiments, multiple tubes may be interconnected with the integrated cooling system to deliver heat transfer fluid to or near various mechanical and/or electrical components for cooling. The tube may be located on the exterior 665 of a curved surface and may extend to at least a location in the midpoint or lower hemisphere of the curved surface. In some embodiments, the curved surface 665 encloses an interior volume 667 of an aircraft. For example, the curved surface 665 may be a portion of an airframe, such as airframe 750 and the interior volume 667 may be interior 770, further described with reference to FIG. 7. As previously described, one or more portions of the tube may be located within airframe 750 and may run along the exterior of an interior surface of the airframe 750 which encloses at least a portion of an interior volume (interior 770) of an aircraft, such as aircraft 700.

Aircraft Examples

Figure 7:
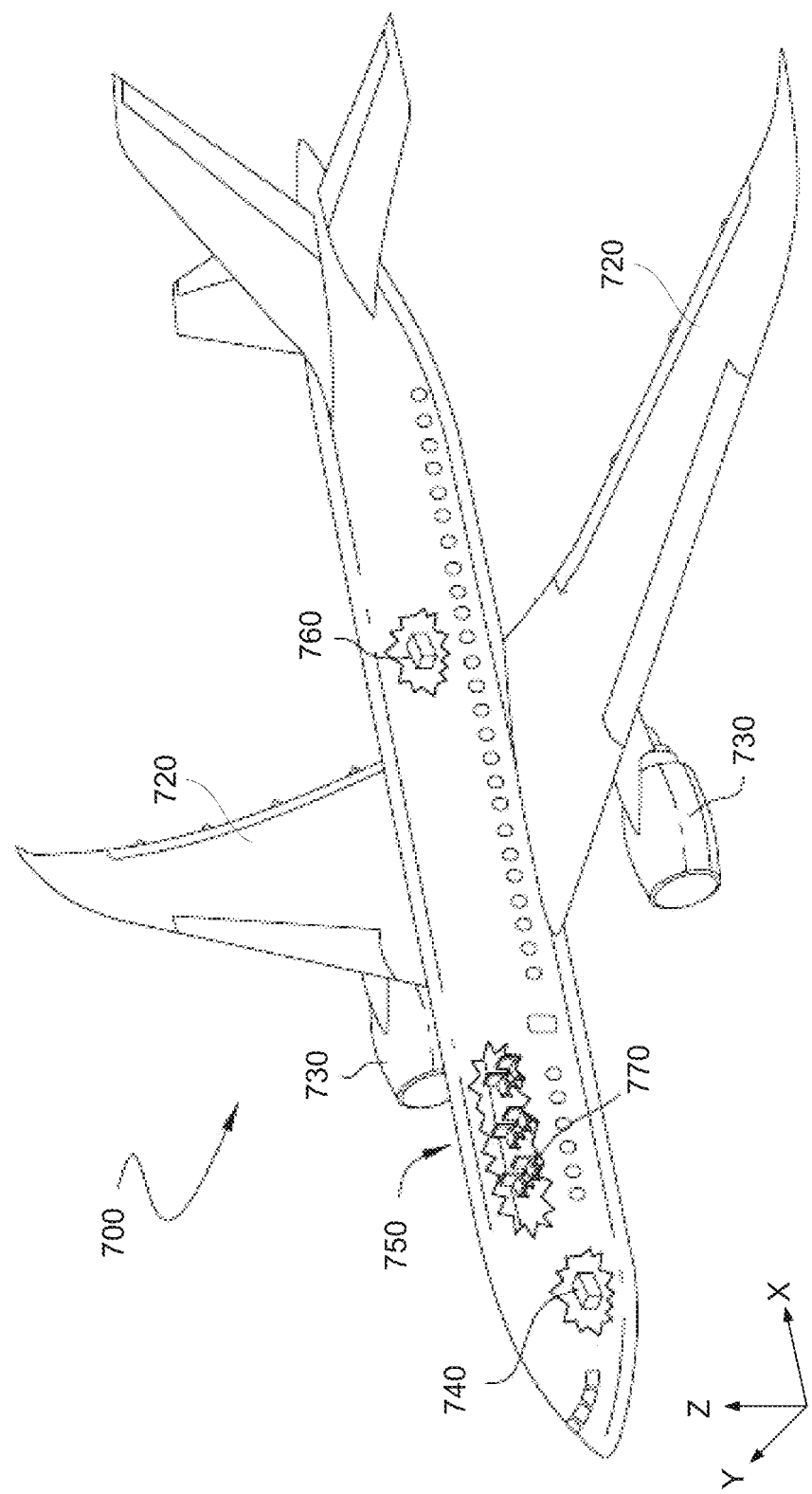
FIG. 7 is a schematic illustration of an aircraft that may include an integrated cooling system which may be used in conjunction with the systems and methods described herein, in accordance with one or more embodiments.
Figure 8:
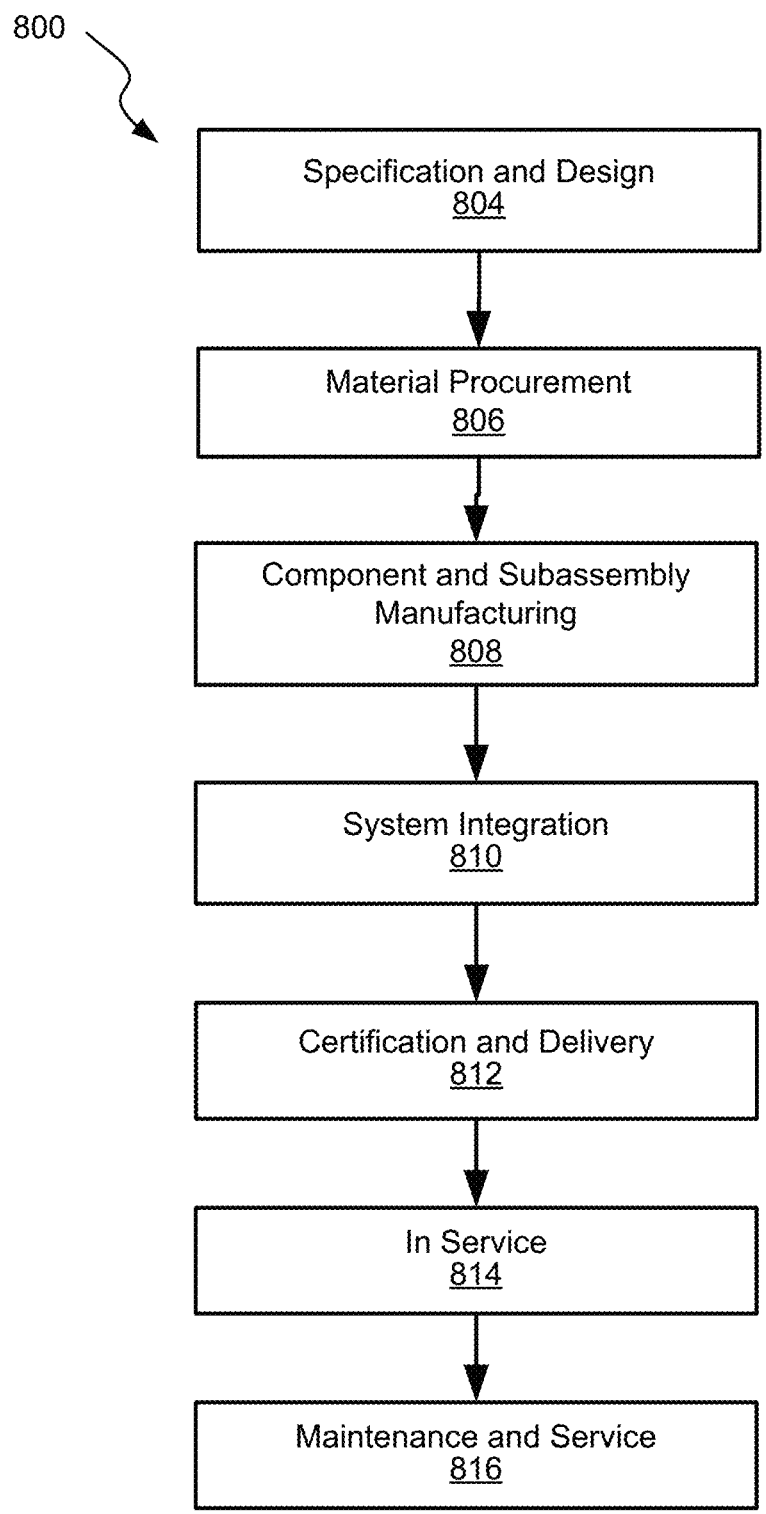
FIG. 8 is a block diagram of aircraft production and service methodology that may utilize methods and assemblies described herein.

Examples of the present disclosure may be described in the context of aircraft 700 as shown in FIG. 7 and aircraft manufacturing and service method 800 as shown in FIG. 8. FIG. 7 is a schematic illustration of an aircraft 700 that may include an integrated cooling system which may be used in conjunction with the systems and methods described herein, in accordance with one or more embodiments. As depicted in FIG. 7, aircraft 700 comprises airframe 750 with interior 770. Aircraft 700 includes wings 720 coupled to airframe 750. Aircraft 700 may also include engines 730 supported by wings 720. In some embodiments, aircraft 700 further includes a number of high-level inspection systems such as electrical inspection system 740 and environmental inspection system.

In other embodiments, any number of other inspection systems may be included. For example, aircraft 700 may include an integrated cooling system 760. Such cooling system may implement liquid cooling to remove high heat loads from various electrical and/or mechanical components, which can otherwise compromise the reliability of a system. Integrated cooling system 760 may implement contact cooling with a liquid cooling loop comprising a series of pumps, heat exchangers, and pipes, tubes, or hoses. Integrated cooling system 760 may alternatively, and/or additionally, implement cabinet cooling which cools components contained in a cabinet by flowing cold liquid through a heat exchanger and distributing the air within the cabinet via the heat exchanger's fan. Integrated cooling system 760 may further comprise a reservoir for the heat transfer fluid, as well as a drainage container for containing condensation and/or leakage transported by the insulating apparatuses described herein.

Aircraft 700 is one example of a vehicle in which an insulating apparatuses, such as apparatus 100, may be implemented and operated, in accordance with an illustrative embodiment. Although an aerospace example is shown, the principles disclosed herein may be applied to other industries, such as the automotive industry. Accordingly, in addition to aircraft 700, the principles disclosed herein may apply to other vehicles, e.g., land vehicles, marine vehicles, space vehicles, etc.

FIG. 8 is a block diagram of aircraft production and service methodology that may utilize methods and assemblies described herein. During pre-production, illustrative method 800 may include specification and design (block 804) of aircraft 700 and material procurement (block 806). During production, component and subassembly manufacturing (block 808) and inspection system integration (block 810) of aircraft 700 may take place. Described apparatus and assemblies may constructed, installed, and/or programmed in any of specification and design (block 804) of aircraft 700, material procurement (block 806), component and subassembly manufacturing (block 808), and/or inspection system integration (block 810) of aircraft 700.

Thereafter, aircraft 700 may go through certification and delivery (block 812) to be placed in service (block 814). While in service, aircraft 700 may be scheduled for routine maintenance and service (block 816). Routine maintenance and service may include modification, reconfiguration, refurbishment, etc. of one or more inspection systems of aircraft 700. Described apparatus, and corresponding methods of operation, may be implemented in any of certification and delivery (block 812), service (block 814), and/or routine maintenance and service (block 816).

Each of the processes of illustrative method 800 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

CONCLUSION

Although the foregoing concepts have been described in some detail for purposes of clarity of understanding, after reading the above-disclosure it will be apparent that certain changes and modifications may be practiced within the scope of the appended claims. It should be noted that there are many alternative ways of implementing the processes, systems, and self-aligning riveting tools. Accordingly, the present examples are to be considered as illustrative and not restrictive.

In the above description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

What is claimed is:

1. A method of draining condensate comprising:
a first operation level having a first condensate producing level;
a second operation level having a second condensate producing level that is higher than the first condensate producing level; and
draining condensate from a tube during the second operation level, wherein the tube is wrapped within an insulating apparatus, wherein the insulating apparatus comprises:
a medial portion extending from a first end to a second end,
a first wrap portion extending from a first side of the medial portion, wherein the first wrap portion is curled around a first longitudinal axis toward the medial portion to form a first cavity defined by an interior surface of the first wrap portion, wherein the tube is located within the first cavity, and
a channel above the medial portion, wherein the channel is defined by an exterior surface of the first wrap portion,
wherein the first cavity is interconnected with the channel through a first gap between the medial portion and a terminal edge of the first wrap portion.

2. The method of claim 1, wherein the insulating apparatus further comprises:
a second wrap portion extending from a second side of the medial portion, wherein the second wrap portion is curled around a second longitudinal axis toward the medial portion to form a second cavity defined by an interior surface of the second wrap portion;
wherein the second cavity is interconnected with the channel through a second gap between the medial portion and a terminal edge of the second wrap portion; and
wherein the channel is further defined by an exterior surface of the second wrap portion.

3. The method of claim 1, wherein the condensate from the tube is drained by:
flowing the condensate produced by the tube in the first cavity through the first gap;
collecting the condensate at the channel; and
transporting the condensate to a predetermined location.

4. The method of claim 1, wherein an integrated cooling system of an aircraft pumps a heat transfer fluid through the tube.

5. The method of claim 1, wherein the tube is located exterior to a curved surface, wherein the curved surface encloses a portion of an interior volume of an aircraft.

6. The method of claim 5, wherein the curved surface encloses an interior volume of an aircraft.

7. A method comprising:
wrapping a first tube and a second tube of a cooling system within an insulating apparatus, wherein the insulating apparatus comprises:
(a) a medial portion extending from a first end to a second end;
(b) a first wrap portion extending from a first side of the medial portion, wherein the first wrap portion is curled around a first longitudinal axis toward the medial portion to form a first cavity defined by an interior surface of the first wrap portion, wherein the first tube is located within the first cavity;
(c) a second wrap portion extending from a second side of the medial portion, wherein the second wrap portion is curled around a second longitudinal axis toward the medial portion to form a second cavity defined by an interior surface of the second wrap portion, wherein the second tube is located within the second cavity; and (d) a channel above the medial portion, wherein the channel is defined by an exterior surface of each of the first wrap portion and the second wrap portion, wherein the first cavity is interconnected with the channel through a first gap between the medial portion and a terminal edge of the first wrap portion, wherein the second cavity is interconnected with the channel through a second gap between the medial portion and a terminal edge of the second wrap portion;

flowing liquid produced by the first tube from the first cavity through the first gap;

flowing liquid produced by the second tube from the second cavity through the second gap;

collecting the liquid at the channel; and transporting the liquid to a predetermined location.

8. The method of claim 7,
wherein wrapping the first tube includes flexing the first wrap portion to expand the first gap to insert the first tube into the first cavity through the first gap; and
wherein wrapping the second tube includes flexing the second wrap portion to expand the second gap to insert the second tube into the second cavity through the second gap.

9. The method of claim 7, wherein transporting the liquid to the predetermined location includes flowing the liquid to the predetermined location through the channel.

10. The method of claim 7, wherein a heat transfer fluid flows through the first tube and the second tube.

11. The method of claim 7, wherein the liquid within each of the first cavity and the second cavity is caused to flow through the first gap and the second gap, respectively, by attitude changes.

12. The method of claim 7, further comprising enclosing the channel with a cover member coupled to the first wrap portion and the second wrap portion such that the channel is enclosed within the cover member, the medial portion, the first wrap portion, and second wrap portion.

13. An insulating apparatus comprising:
a medial portion extending from a first end to a second end;
a first vertical portion extending from a first side of the medial portion and substantially perpendicular to the medial portion;
a first wrap portion extending from the first vertical portion, wherein the first wrap portion is curled around a first longitudinal axis and toward the first vertical portion to form a first cavity defined by an interior surface of the first wrap portion;
a second vertical portion extending from a second side of the medial portion and substantially perpendicular to the medial portion;
a second wrap portion extending from the second vertical portion, wherein the second wrap portion is curled around a second longitudinal axis and toward the second vertical portion to form a second cavity defined by an interior surface of the second wrap portion; and
a channel above the medial portion, the channel defined by at least by an exterior surface of each of the first wrap portion and the second wrap portion;
wherein the first cavity is interconnected with the channel through a first gap between the first vertical portion and a terminal edge of the first wrap portion; and
wherein the second cavity is interconnected with the channel through a second gap between the second vertical portion and a terminal edge of the second wrap portion.

14. The insulating apparatus of claim 13,
wherein the first cavity is configured to surround a first tube, and the second cavity is configured to surround a second tube; and
wherein a heat transfer fluid flows through the first tube and the second tube.

15. The insulating apparatus of claim 14,
wherein the first wrap portion is flexed to expand the first gap such that the first tube is inserted into the first cavity through the first gap; and
wherein the second wrap portion is flexed to expand the second gap such that the second tube is inserted into the second cavity through the second gap.

16. The insulating apparatus of claim 14, wherein a cross-sectional profile of the first cavity corresponds to a cross-sectional profile of the first tube, and wherein a cross-sectional profile of the second cavity corresponds to a cross-sectional profile of the second tube.

17. The insulating apparatus of claim 13, wherein the first gap and the second gap are configured to allow liquid within the first cavity and the second cavity to drain to the channel, respectively.

18. The insulating apparatus of claim 13, wherein liquid within the first cavity and the second cavity is caused to flow through the first gap and the second gap, respectively, by attitude changes.

19. The insulating apparatus of claim 13, further comprising a cover member coupled to the first wrap portion and the second wrap portion such that the channel is enclosed within the cover member, the medial portion, the first wrap portion, and second wrap portion.

20. The insulating apparatus of claim 13, wherein the channel is further defined by a portion of the first vertical portion and a portion of the second vertical portion.

* * * * *